(12) United States Patent
Zhou et al.

(10) Patent No.: US 11,215,046 B2
(45) Date of Patent: Jan. 4, 2022

(54) WELLBORE INSPECTION SYSTEM AND METHOD FOR ULTRA-DEEP VERTICAL SHAFT

(71) Applicant: China University of Mining and Technology, Jiangsu (CN)

(72) Inventors: Gongbo Zhou, Jiangsu (CN); Chaoquan Tang, Jiangsu (CN); Zhencai Zhu, Jiangsu (CN); Hongwei Tang, Jiangsu (CN); Zhenzhi He, Jiangsu (CN); Gang Zhang, Jiangsu (CN); Wei Li, Jiangsu (CN); Fan Jiang, Jiangsu (CN)

(73) Assignee: China University of Mining and Technology, Jiangsu (CN)

( * ) Notice: Subject to any disclaimer, the term of this patent is extended or adjusted under 35 U.S.C. 154(b) by 0 days.

(21) Appl. No.: 17/043,691

(22) PCT Filed: Nov. 11, 2019

(86) PCT No.: PCT/CN2019/117024
§ 371 (c)(1),
(2) Date: Sep. 30, 2020

(87) PCT Pub. No.: WO2021/056717
PCT Pub. Date: Apr. 1, 2021

(65) Prior Publication Data
US 2021/0262336 A1 Aug. 26, 2021

(30) Foreign Application Priority Data
Sep. 23, 2019 (CN) .......................... 201910901137.7

(51) Int. Cl.
*E21B 47/002* (2012.01)
*E21B 19/02* (2006.01)
(Continued)

(52) U.S. Cl.
CPC ............. *E21B 47/002* (2020.05); *E21B 19/02* (2013.01); *E21B 47/09* (2013.01); *E21B 47/12* (2013.01);
(Continued)

(58) Field of Classification Search
CPC ........ E21B 47/09; E21B 47/002; E21B 47/19; E21B 19/02; E21B 47/12; E21F 17/18;
(Continued)

(56) References Cited

U.S. PATENT DOCUMENTS 6,041,860 A * 3/2000 Nazzal .................. E21B 43/114
166/250.01
10,112,664 B2 10/2018 Li
(Continued)

FOREIGN PATENT DOCUMENTS

CN 201217460 4/2009
CN 105035200 11/2015
(Continued)

OTHER PUBLICATIONS

"International Search Report (Form PCT/ISA/210)" of PCT/CN2019/117024, dated Jun. 9, 2020, pp. 1-4.
(Continued)

*Primary Examiner* — Christopher J Sebesta
(74) *Attorney, Agent, or Firm* — JCIPRNET (57) ABSTRACT

Disclosed are a wellbore inspection system and method for an ultra-deep vertical shaft. The wellbore inspection system includes a wire rope moving system, inspection robots, a visual image acquisition system, a wireless communication module, a central control system, and an image post-processing system of an upper computer. The wire rope moving system includes a surface wire rope guide rail, an underground wire rope guide rail, a surface wire rope moving device, an underground wire rope moving device, and a wire
(Continued)

rope. The visual image acquisition system includes explosion-proof cameras. After image information acquired by the explosion-proof cameras is processed by a lower computer, the processed image is transmitted by a wireless image transmission module to the image post-processing system of the upper computer. The central control system is connected to the inspection robots and the wire rope moving system, and the inspection robots are connected to the central control system.

7 Claims, 8 Drawing Sheets

(51) Int. Cl.
*E21B 47/09* (2012.01)
*E21B 47/12* (2012.01)
*E21F 17/18* (2006.01)
*H04N 5/225* (2006.01)
*H04N 7/18* (2006.01)

(52) U.S. Cl.
CPC .............. *E21F 17/18* (2013.01); *H04N 5/225* (2013.01); *H04N 7/185* (2013.01); *H04N 2005/2255* (2013.01)

(58) Field of Classification Search
CPC . H04N 5/225; H04N 7/185; H04N 2005/2255
See application file for complete search history.

(56) References Cited

U.S. PATENT DOCUMENTS

| | | | |
|---|---|---|---|
| 2009/0283261 A1* | 11/2009 | Poitzsch | E21B 23/08 166/250.02 |
| 2018/0209265 A1* | 7/2018 | Fouda | E21B 47/135 |
| 2019/0369283 A1* | 12/2019 | Hanson | G06T 11/20 |
| 2019/0377254 A1* | 12/2019 | Thursby | G03B 37/005 |
| 2021/0115781 A1* | 4/2021 | Stark | H04N 5/247 |

FOREIGN PATENT DOCUMENTS

| | | |
|---|---|---|
| CN | 206483617 | 9/2017 |
| CN | 110181529 | 8/2019 |

OTHER PUBLICATIONS

"Written Opinion of the International Searching Authority (Form PCT/ISA/237)" of PCT/CN2019/117024, dated Jun. 9, 2020, pp. 1-5.

* cited by examiner

WELLBORE INSPECTION SYSTEM AND METHOD FOR ULTRA-DEEP VERTICAL SHAFT

CROSS-REFERENCE TO RELATED APPLICATION

This application is a 371 of international application of PCT application serial no. PCT/CN2019/117024, filed on Nov. 11, 2019, which claims the priority benefit of China application no. 201910901137.7, filed on Sep. 23, 2019. The entirety of each of the above mentioned patent applications is hereby incorporated by reference herein and made a part of this specification.

BACKGROUND OF THE INVENTION

Field of the Invention

The present invention relates to the field of mechanical engineering technologies, and in particular, to a wellbore inspection system and method for an ultra-deep vertical shaft.

Description of Related Art

With the increase in mining depth of coal mines, deep and ultra-deep wells are becoming the mainstreams in development of future construction of the coal mines. During coal production, an ultra-deep wellbore, as the only means of hoisting solid mineral resources at depth, is an essential part of a coal production system. Due to complex geological conditions, airflow environment, machine vibration, and other factors, cracks, deformation, water seepage, or the like may occur on the wellbore wall. Once the ultra-deep wellbore has a defect, coal production may be paralyzed, seriously affecting the economic efficiency of a mine and safety of workers.

At present, on one hand, most domestic coal mines still resort to a regular, manual inspection manner to detect a working condition of the ultra-deep wellbore. This is a rather backward approach, not only failing to detect a wellbore health condition in the ultra-deep wellbore in real time, but also failing to accurately determine and measure the position of an anomaly in the ultra-deep wellbore. On the other hand, experts at home and abroad have conducted mature research on the inspection system in a common environment, but little research has been done on a wellbore inspection system for an ultra-deep vertical shaft. Therefore, for ultra-deep shafts with rather complex geological conditions, it is required to establish a set of inspection system integrated with advanced sensor control technology and composed of inspection robots, to improve the application of health monitoring technology based on a wireless sensor network in the ultra-deep wellbores, thus guaranteeing the safety in industrial production.

SUMMARY OF THE INVENTION

In view of this, the present invention provides a wellbore inspection system and method for an ultra-deep vertical shaft, so as to solve the problems mentioned above in the prior art.

To achieve the foregoing objective, the present invention adopts the following technical solutions:

A wellbore inspection system for an ultra-deep vertical shaft includes a wire rope moving system, inspection robots, a visual image acquisition system, a wireless communication module, a central control system, and an image post-processing system of an upper computer, where the wire rope moving system includes: a surface wire rope guide rail on the ground, an underground wire rope guide rail, a surface wire rope moving device fitted into the surface wire rope guide rail, an underground wire rope moving device fitted into the underground wire rope guide rail, and a wire rope of which the upper end is connected to the surface wire rope moving device and the lower end is connected to the underground wire rope moving device; and a plurality of inspection robots are arranged along the wire rope;

the wireless communication module includes a wireless data transmission module, a wireless image transmission module, and a GPS positioning module;

the visual image acquisition system includes a lower computer and explosion-proof cameras; after image information acquired by the explosion-proof cameras is processed by the lower computer, the processed image is transmitted by the wireless image transmission module to the image post-processing system of the upper computer;

the central control system is connected to the inspection robots and the wire rope moving system via the wireless data transmission module, and the inspection robots are connected to the central control system via the GPS positioning module;

the central control system includes an inspection robot control module for controlling working conditions of the inspection robots; a wire rope moving device control module for controlling movement of the surface wire rope moving device and the underground wire rope moving device in the wire rope moving system; and a wireless communication control module for controlling communication between the central control system, the inspection robots, and the wire rope moving system; and when it is required to longitudinally monitor the wellbore, the central control system halts the wire rope moving system and starts the inspection robots to longitudinally climb on the wire rope, to acquire longitudinal images of the wellbore with the explosion-proof cameras; when it is required to monitor the circumference of the wellbore, the central control system halts the inspection robots to suspend the inspection robots on the wire rope; and starts the wire rope moving system to drive the inspection robots on the wire rope to acquire circumferential images of the wellbore; and when it is required to monitor specific positions in the wellbore, the central control system controls the inspection robots and the wire rope moving system simultaneously until the inspection robots reach the target positions, and then the explosion-proof cameras are used to acquire images of the target positions in the wellbore.

Further, the image post-processing system of the upper computer forms a monitoring network in the wellbore according to image information fed back by the explosion-proof cameras respectively carried by the inspection robots; when one or some of the inspection robots fail, the central control system uses the inspection robot control module to automatically control drive mechanisms of the remaining normal inspection robots and uses the wire rope moving device control module to automatically control a drive mechanism of the wire rope moving system according to influence of the faulty inspection robot on the monitoring network, to adjust a patrol and monitoring scope of each normal inspection robot and further to repair the monitoring network.

Further, the underground and surface wire rope moving devices are identical in structure, and separately include a housing, a drive motor, and a plurality of moving rollers; a wire rope locking mechanism capable of firmly clamping the wire rope is provided on the housing; and the moving rollers include a driving roller and one or more driven rollers; and each moving roller is positioned and supported by a roller shaft which is mounted in the housing via a bearing; a drive motor base is fixedly mounted on the housing, and a power output end of the drive motor is connected via a reducer to the roller shaft which supports the driving roller.

Further, the underground wire rope moving device and the surface wire rope moving device are each provided with a guide mechanism; the guide mechanism includes a transverse guide mechanism and a longitudinal guide mechanism; the transverse guide mechanism includes a transverse guide support and a transverse guide roller; the transverse guide support is connected to the housing at one end and further connected to the transverse guide roller at the other end, and the transverse guide roller is axially parallel to a rolling face where the moving rollers are located; the longitudinal guide mechanism includes a longitudinal guide support and a longitudinal guide roller; the longitudinal guide support is connected to the housing at one end and further connected to the longitudinal guide roller at the other end, and the longitudinal guide roller is axially perpendicular to the rolling face where the moving rollers are located; and driven by the drive motor, the driving roller operates in cooperation with the transverse guide mechanism and the longitudinal guide mechanism to implement positioning and guiding, thus driving the driven rollers to always move along the wire rope moving track.

Further, a track main body further includes a transverse guide face and a longitudinal guide face; one side of the rolling face is provided with the longitudinal guide face perpendicular to the rolling face, and the other side thereof is provided with an L-shaped groove formed by a vertical section and a transverse section which communicate at the bend; an extension direction of the vertical section is perpendicular to the rolling face, and an opening of the vertical section is flush with the rolling face; an extension direction of the transverse section is parallel to the rolling face, and the transverse section has the transverse guide face parallel to the rolling face; the moving rollers are directly provided above the rolling face; the transverse guide support is disposed in the vertical section of the groove, and the transverse guide roller is disposed in the transverse section; one end of the transverse guide support extends out of the vertical section and is then connected to the housing, and the other end of the transverse guide support is connected to the transverse guide roller hooked onto the transverse guide face; the transverse guide roller is connected to the transverse guide face via a wire, and the longitudinal guide roller is connected to the longitudinal guide face via a wire; and driven by the drive motor, the driving roller can drive the transverse guide roller to roll along the transverse guide face, the longitudinal guide roller to roll along the longitudinal guide face, and the driven rollers to roll along the rolling face.

Further, the housing is designed in the shape of a circular sector, and the roller shafts are distributed in a radial direction of the circular-sector-shaped housing; two radial section ends of the circular-sector-shaped housing are separately provided with a fixing rack, and each fixing rack is provided with one longitudinal guide mechanism and one transverse guide mechanism; the longitudinal guide mechanism is provided on the end, of the fixing rack, that adjoins an inner circular surface of the circular-sector-shaped housing; and the transverse guide mechanism is provided on the end, of the fixing rack, that adjoins an outer circular surface of the circular-sector-shaped housing; the two longitudinal guide mechanisms respectively provided on the two radial section ends of the circular-sector-shaped housing are symmetrically arranged, and the two transverse guide mechanisms respectively provided on the two radial section ends of the circular-sector-shaped housing are symmetrically arranged; the axis of the longitudinal guide roller is perpendicular to the circular-sector-shaped surface of the circular-sector-shaped housing, and the axis of the transverse guide roller is parallel to the circular-sector-shaped surface of the circular-sector-shaped housing; positions where the longitudinal guide support and the transverse guide support are disposed on the fixing rack can be adjusted in a radial direction of the circular-sector-shaped housing.

Another technical objective of the present invention is to provide a wellbore inspection method for an ultra-deep vertical shaft, which includes the following steps:

(1) before inspection, vertically dividing a wellbore into sections, and equipping each section with one inspection robot, such that the inspection robots take charge of inspection in their respective regions; determining position information of the inspection robots during arrangement of the inspection robots; and further positioning an underground wire rope moving device and a surface wire rope moving device before inspection;

(2) during inspection, monitoring, by each inspection robot, the wellbore within its designated inspection region, capturing wall images of the wellbore with an explosion-proof camera, and uploading the acquired images to an image post-processing system of an upper computer; acquiring, by a GPS positioning module, real-time position information of the inspection robots and uploading the information to a central control system; detecting position information of the underground wire rope moving device and the surface wire rope moving device in real time by using position detection devices respectively mounted on the underground wire rope moving device and the surface wire rope moving device, and uploading the information to the central control system in real time; determining, by the central control system according to the received real-time position information of the underground wire rope moving device and the surface wire rope moving device, whether the two moving devices are synchronized in movement; and if they are not synchronized in movement, controlling the underground wire rope moving device and the surface wire rope moving device to be synchronized in movement; and (3) after the inspection, processing, by the image post-processing system of the upper computer, the acquired images, to determine whether the wellbore has a defect.

Advantageous Effect (1) The wellbore inspection system for an ultra-deep vertical shaft in the present invention can implement monitoring of the mine wellbore while meeting an explosion-proof requirement in a coal mine, and is applicable to all deep environments, thus realizing real-time monitoring of the surrounding environment.

(2) The wire rope used in the present invention can be replaced with another bar-shaped object as required, such as a rigid rod or a cable. Different inspection robots can be designed according to the diameter of the wire rope in an application environment, extending the scope of application of the robots to the wire ropes of different diameters and the environment monitoring scope. Therefore, the present invention is universally applicable and multifunctional.

(3) The control system can determine coordinates of each robot in the wellbore in real time, such that the workers can conveniently determine a defective position on the wellbore and a specific faulty robot.

(4) The inspection robot can control its inspection speed in real time, meeting the requirements on the inspection speed in different working conditions.

(5) A plurality of inspection robots can be arranged according to their inspection requirements, so as to form a monitoring network.

(6) The wellbore inspection system for an ultra-deep vertical shaft in the present invention can realize overall inspection of the wellbore, including longitudinal and circumferential monitoring.

(7) The present invention not only can detect cracks and water seepage in the wellbore, but also can monitor working apparatuses in the working environment, ensuring normal operation of the working apparatuses.

(8) The present invention can further employ an infrared, millimeter-wave, or radar sensor device as required to expand the functions of the system, thus being universally applicable and multifunctional.

BRIEF DESCRIPTION OF THE DRAWINGS

The accompanying drawings that constitute a part of the present invention are used to improve the understanding of the present invention. The machine descriptions in the exemplary embodiments of the present invention are used to explain the present invention, but do not constitute an improper limitation on the present invention. In the drawings.

where meanings of the numerals are as follows: 2-1. Circular-sector-shaped surface of a housing, 2-2. Radial section end of the housing, 2-3. Wire rope tensioning mechanism, 2-4. Motor, 2-5. Connecting bolt, 2-6. Reducer end cover, 2-7. Spring, 2-8. Horizontal rod, 2-9. Longitudinal guide support, 2-10. Longitudinal guide roller, 2-11. Transverse guide support, 2-12. Transverse guide roller, 2-13. Driven roller, 2-14. Reducer, 2-15. Driving roller, 2-16. Bearing, 2-17. Limiting nut of the transverse guide roller, 2-18. Sleeve, and 8. Wire rope moving track.

DETAILED DESCRIPTION OF THE INVENTION

The present invention is further described below with reference to the accompanying drawings.

A wellbore inspection system for an ultra-deep vertical shaft includes a wire rope moving system, inspection robots, a visual image acquisition system, a wireless communication module, a central control system, and an image post-processing system of an upper computer.

The wire rope moving system includes: a surface wire rope guide rail on the ground, an underground wire rope guide rail, a surface wire rope moving device fitted into the surface wire rope guide rail, an underground wire rope moving device fitted into the underground wire rope guide rail, and a wire rope of which the upper end is connected to the surface wire rope moving device and the lower end is connected to the underground wire rope moving device. The wire rope has been subjected to tensioning processing. The surface/underground wire rope moving device is required to be mounted in place in advance before inspection, and designed with high explosion-proof performance and reliability. During mounting, synchronization should be guaranteed between the surface and underground wire rope moving devices, so as to realize alignment during movement of the two devices.

A plurality of inspection robots are arranged along the wire rope, and able to climb on the wire rope. Each inspection robot conducts inspection within a designated scope. When one or some of the robots fail, a monitoring network is repaired according to influence of the fault on the monitoring network. Moreover, each inspection robot may be fitted with an infrared, millimeter-wave, or radar sensor device as required. Before the inspection, the wellbore is vertically divided into sections according to its depth, and the inspection robots take charge of inspection in their respective regions, to ensure the inspection efficiency. During arrangement of the inspection robots before the inspection, it is required to first determine positions of these inspection robots, such that they are located in their respective inspection regions before the inspection.

The wireless communication module includes a wireless data transmission module, a wireless image transmission module, and a GPS positioning module. The wireless data transmission module can transmit signals acquired by the sensors carried by the inspection robots to the upper computer, thus realizing monitoring of the inspection robots, the wire rope, and the wellbore. The wireless image transmission module can transmit images acquired by the visual image acquisition system to the upper computer for further processing.

The visual image acquisition system includes a lower computer and explosion-proof cameras. After image information acquired by the explosion-proof cameras is processed by the lower computer, the processed image is transmitted by the wireless image transmission module to the image post-processing system of the upper computer. Respectively mounted on the inspection robots, the explosion-proof cameras can monitor the wellbore longitudinally when the inspection robots climb on the wire rope. When the inspection robots are suspended on the wire rope and keep stationary, the wire rope is driven by the wire rope moving devices to make one turn around the wellbore, thus circumferentially monitoring the wellbore. The robots may also move in synchronization with the wire rope moving devices, to rapidly determine a target position.

The central control system is connected to the inspection robots and the wire rope moving system via the wireless data transmission module, and the inspection robots are connected to the central control system via the GPS positioning module.

The central control system includes an inspection robot control module for controlling working conditions of the inspection robots; a wire rope moving device control module for controlling movement of the surface wire rope moving device and the underground wire rope moving device in the wire rope moving system; and a wireless communication control module for controlling communication between the central control system, the inspection robots, and the wire rope moving system. The central control system is mainly used to make a proper strategic adjustment for the foregoing three parts, so as to realize overall inspection of the wellbore.

The image post-processing system of the upper computer includes a wellbore wall processing module which has an alerting function and is used to strategically control the arrangement of the inspection robots.

When it is required to longitudinally monitor the wellbore, the central control system halts the wire rope moving system and starts the inspection robots to longitudinally climb on the wire rope, to acquire longitudinal images of the wellbore with the explosion-proof cameras. When it is required to monitor the circumference of the wellbore, the central control system halts the inspection robots to suspend the inspection robots on the wire rope; and starts the wire rope moving system to drive the inspection robots on the wire rope to acquire circumferential images of the wellbore. When it is required to monitor specific positions in the wellbore, the central control system controls the inspection robots and the wire rope moving system simultaneously until the inspection robots reach the target positions, and then the explosion-proof cameras are used to acquire images of the target positions in the wellbore.

Further, the image post-processing system of the upper computer forms a monitoring network in the wellbore according to image information fed back by the explosion-proof cameras respectively carried by the inspection robots. When one or some of the inspection robots fail, the central control system uses the inspection robot control module to automatically control drive mechanisms of the remaining normal inspection robots and uses the wire rope moving device control module to automatically control a drive mechanism of the wire rope moving system according to influence of the faulty inspection robot on the monitoring network, to adjust a patrol and monitoring scope of each normal inspection robot and further to repair the monitoring network.

Further, the underground and surface wire rope moving devices are identical in structure, and separately include a housing, a drive motor, and a plurality of moving rollers. A wire rope locking mechanism capable of firmly clamping the wire rope is provided on the housing; and the moving rollers include a driving roller and one or more driven rollers.

Each moving roller is positioned and supported by a roller shaft which is mounted in the housing via a bearing. A drive motor base is fixedly mounted on the housing, and a power output end of the drive motor is connected via a reducer to the roller shaft which supports the driving roller.

Further, the underground wire rope moving device and the surface wire rope moving device are each provided with a guide mechanism. The guide mechanism includes a transverse guide mechanism and a longitudinal guide mechanism. The transverse guide mechanism includes a transverse guide support and a transverse guide roller. The transverse guide support is connected to the housing at one end and further connected to the transverse guide roller at the other end, and the transverse guide roller is axially parallel to a rolling face where the moving rollers are located. The longitudinal guide mechanism includes a longitudinal guide support and a longitudinal guide roller. The longitudinal guide support is connected to the housing at one end and further connected to the longitudinal guide roller at the other end, and the longitudinal guide roller is axially perpendicular to the rolling face where the moving rollers are located. Driven by the drive motor, the driving roller operates in cooperation with the transverse guide mechanism and the longitudinal guide mechanism to implement positioning and guiding, thus driving the driven rollers to always move along the wire rope moving track.

Further, a track main body further includes a transverse guide face and a longitudinal guide face. One side of the rolling face is provided with the longitudinal guide face perpendicular to the rolling face, and the other side thereof is provided with an L-shaped groove formed by a vertical section and a transverse section which communicate at the bend. An extension direction of the vertical section is perpendicular to the rolling face, and an opening of the vertical section is flush with the rolling face. An extension direction of the transverse section is parallel to the rolling face, and the transverse section has the transverse guide face parallel to the rolling face. The moving rollers are directly provided above the rolling face. The transverse guide support is disposed in the vertical section of the groove, and the transverse guide roller is disposed in the transverse section. One end of the transverse guide support extends out of the vertical section and is then connected to the housing, and the other end of the transverse guide support is connected to the transverse guide roller hooked onto the transverse guide face. The transverse guide roller is connected to the transverse guide face via a wire, and the longitudinal guide roller is connected to the longitudinal guide face via a wire. Driven by the drive motor, the driving roller can drive the transverse guide roller to roll along the transverse guide face, the longitudinal guide roller to roll along the longitudinal guide face, and the driven rollers to roll along the rolling face.

Further, the housing is designed in a circular sector shape, and the roller shafts are distributed in a radial direction of the circular-sector-shaped housing. Two radial section ends of the circular-sector-shaped housing are separately provided with a fixing rack, and each fixing rack is provided with one longitudinal guide mechanism and one transverse guide mechanism. The longitudinal guide mechanism is provided on the end, of the fixing rack, that adjoins an inner circular surface of the circular-sector-shaped housing; and the transverse guide mechanism is provided on the end, of the fixing rack, that adjoins an outer circular surface of the circular-sector-shaped housing. The two longitudinal guide mechanisms respectively provided on the two radial section ends of the circular-sector-shaped housing are symmetrically arranged, and the two transverse guide mechanisms respectively provided on the two radial section ends of the circular-sector-shaped housing are symmetrically arranged. The axis of the longitudinal guide roller is perpendicular to the circular-sector-shaped surface of the circular-sector-shaped housing, and the axis of the transverse guide roller is parallel to the circular-sector-shaped surface of the circular-sector-shaped housing. Positions where the longitudinal guide support and the transverse guide support are disposed on the fixing rack can be adjusted in a radial direction of the circular-sector-shaped housing.

Another technical objective of the present invention is to provide a wellbore inspection method for an ultra-deep vertical shaft, which includes the following steps:

(1) Before inspection, a wellbore is vertically divided into sections, and each section is equipped with one inspection robot, such that the inspection robots take charge of inspection in their respective regions. During arrangement of the inspection robots, their position information is determined. An underground wire rope moving device and a surface wire rope moving device are further positioned before inspection.

(2) During inspection, each inspection robot monitors the wellbore within its designated inspection region, captures wall images of the wellbore with an explosion-proof camera, and uploads the acquired images to an image post-processing system of an upper computer. A GPS positioning module acquires real-time position information of the inspection robots and uploads the information to the central control system. Position information of the underground wire rope moving device and the surface wire rope moving device is detected in real time by using position detection devices respectively mounted on the underground wire rope moving device and the surface wire rope moving device, and is uploaded to the central control system in real time. The central control system determines, according to the received real-time position information of the underground wire rope moving device and the surface wire rope moving device, whether the two moving devices are synchronized in movement. If they are not synchronized in movement, the underground wire rope moving device and the surface wire rope moving device are controlled to be synchronized in movement.

(3) After the inspection, the image post-processing system of the upper computer processes the acquired images, to determine whether the wellbore has a defect.

Embodiment

A specific embodiment of the present invention is described in detail below with reference to the accompanying drawings.

Figure 1:
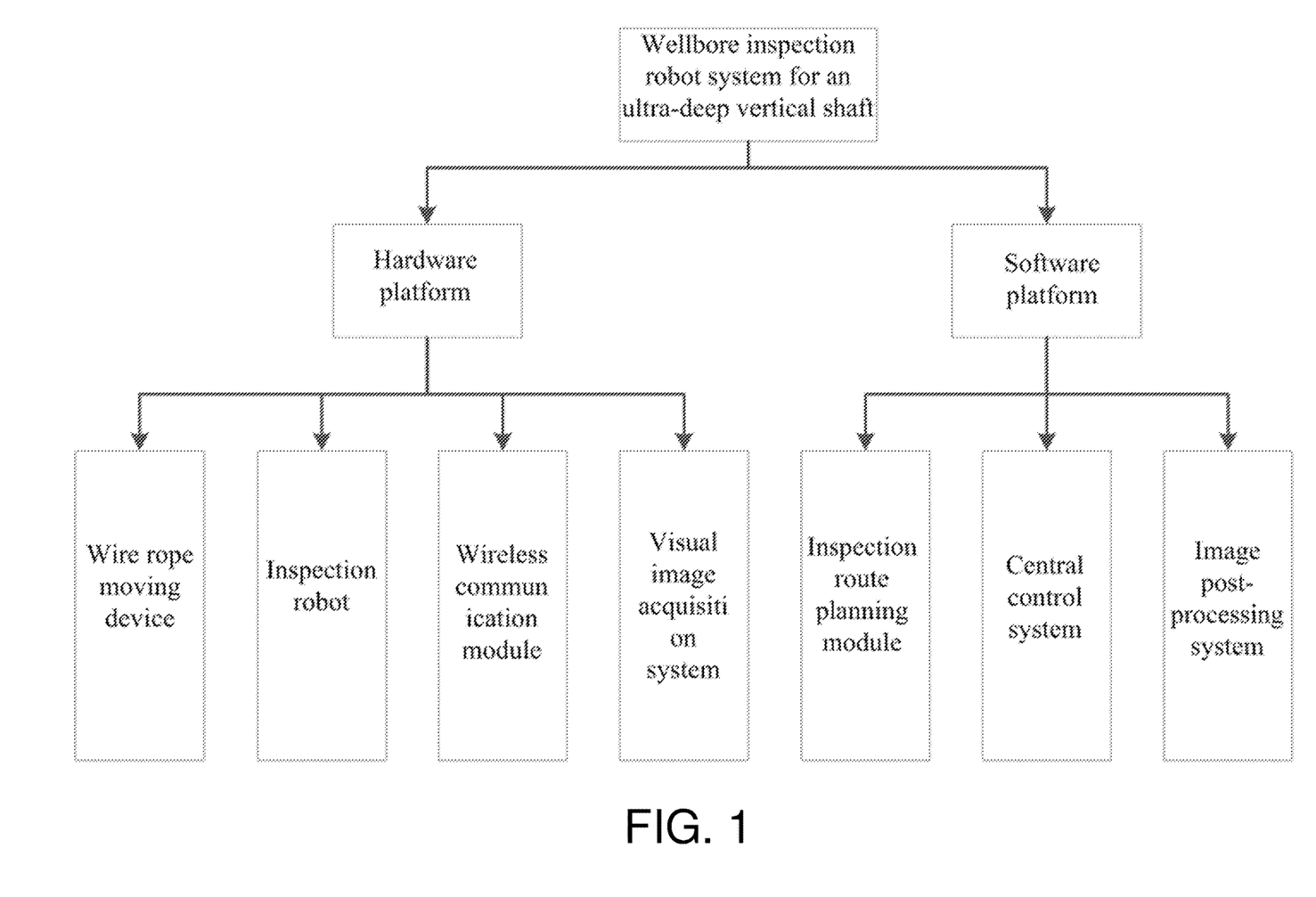
FIG. 1 is an overall block diagram of a wellbore inspection system for an ultra-deep vertical shaft in an embodiment of the present invention.
Figure 2:
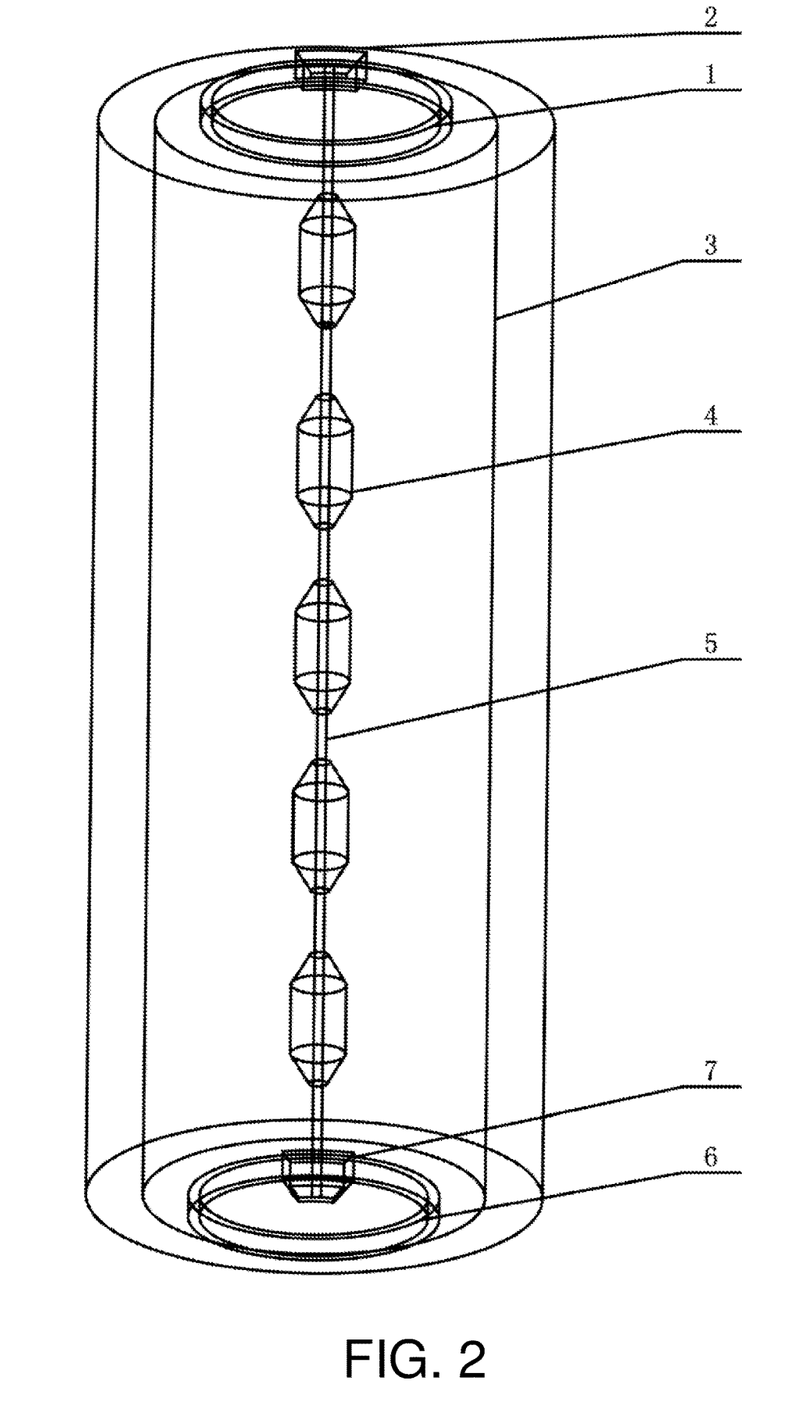
FIG. 2 is a schematic structural diagram of the wellbore inspection system for an ultra-deep vertical shaft in an embodiment of the present invention; where meanings of the numerals are as follows: 1. Surface wire rope guide rail, 2. Surface wire rope moving device, 3. Wellbore wall, 4. Inspection robots, 5. Wire rope, 6. Underground wire rope guide rail, and 7. Underground wire rope moving device.
Figure 3:
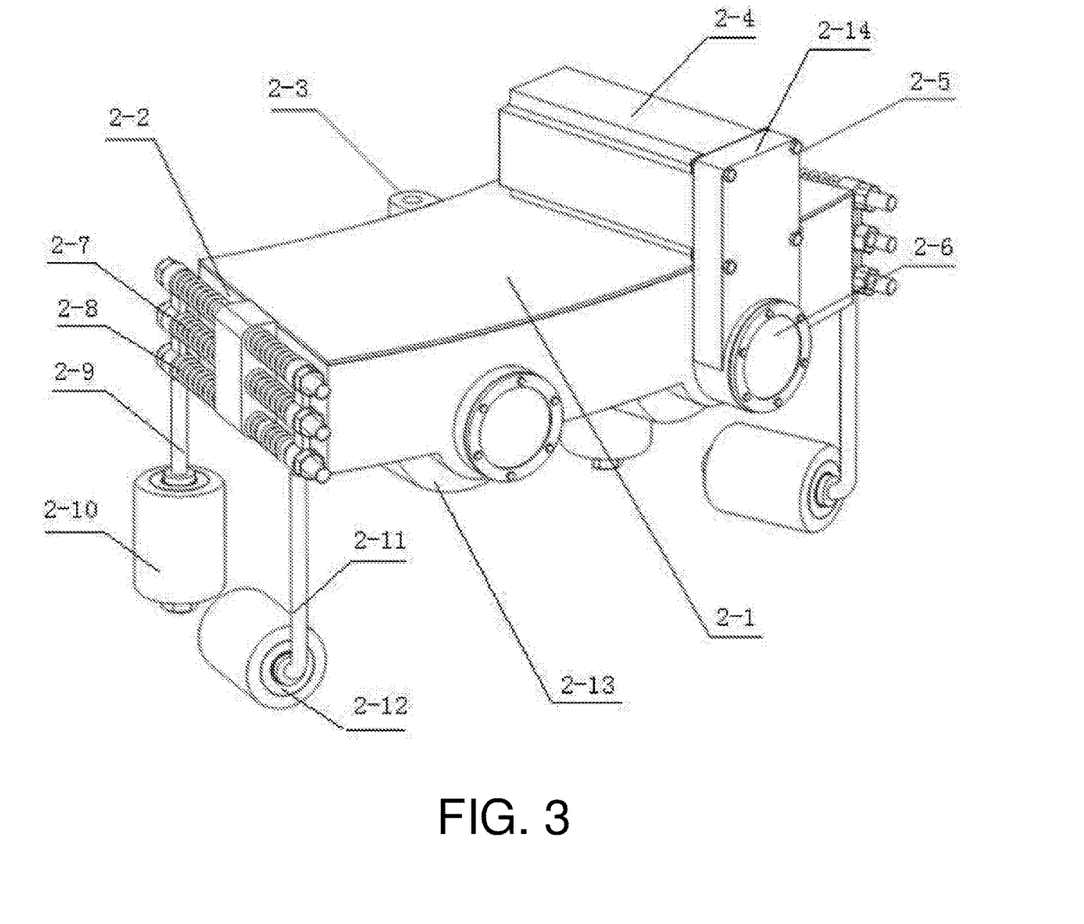
FIG. 3 is a schematic structural diagram of the surface/underground wire rope moving device in FIG. 1.
Figure 4:
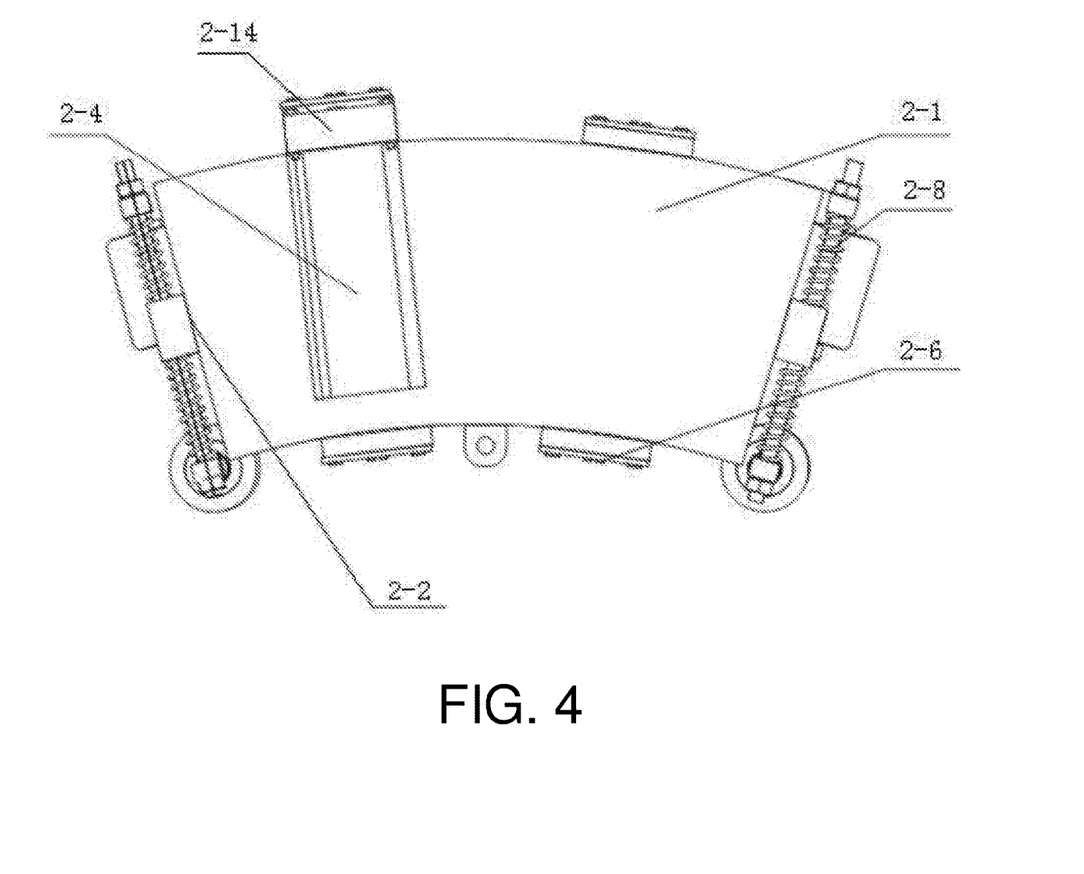
FIG. 4 is a top view of the surface/underground wire rope moving device in FIG. 1.

FIG. 1 is an overall block diagram of a wellbore inspection system for an ultra-deep vertical shaft in an embodiment of the present invention. A hardware platform of the system is shown in FIG. 2, where a wire rope moving system includes a surface wire rope guide rail 1, an underground wire rope guide rail 6, a surface wire rope moving device 2, and an underground wire rope moving device 7. The wire rope guide rails are respectively located on the ground and underground. The wire rope moving devices are respectively arranged on the wire rope guide rails, and make one turn on the guide rails around the wellbore. A wire rope 5 is fixedly connected to the wire rope moving devices after being tensioned, and the wire rope moving devices drive the wire rope 5 to make one turn around the wellbore. The inspection robots 4 are arranged on the wire rope 5, and are able to climb on the wire rope 5. Each inspection robot performs inspection within its designated scope. When one or some of the robots fail, a monitoring network may be repaired according to influence of the fault on the monitoring network.

The wire rope moving devices include the surface wire rope moving device 2 and the underground wire rope moving device 7 respectively located on the surface wire rope guide rail 1 and the underground wire rope guide rail 6. There are many ways to secure the wire rope guide rail on the ground, which include but are not limited to, concrete, bolts, welding, and the like.

The inspection robots 4 may be fitted with an infrared, millimeter-wave, or radar sensor device as required, so as to expand the functions of the system.

The visual image acquisition system includes a lower computer and explosion-proof cameras. Respectively mounted on the inspection robots 4, the explosion-proof cameras can monitor the wellbore longitudinally when the inspection robots climb on the wire rope 5. When the inspection robots 4 are suspended on the wire rope 5 and keep stationary, the wire rope 5 is driven by the wire rope moving devices to make one turn around the wellbore, thus circumferentially monitoring the wellbore. The inspection robots 4 may also move in synchronization with the wire rope moving devices, to rapidly determine a target position.

A wireless communication module includes a wireless data transmission module and a wireless image transmission module. The wireless data transmission module can transmit signals acquired by the sensors carried by the inspection robots to an upper computer, thus realizing monitoring of the inspection robots 4, the wire rope 5, and the wellbore. The wireless image transmission module can transmit images acquired by a visual image acquisition system to the upper computer for further processing, to further improve the accuracy and efficiency of information detection, avoiding an inspection omission.

As shown from FIG. 3 to FIG. 6, the surface wire rope moving device/the underground wire rope moving device (collectively referred to as a wire rope moving device below for ease of description) of the present invention includes a housing, a drive motor, and a plurality of moving rollers. The size and number of the moving rollers may be determined according to a specific load, and the outer edge of each moving roller may be coated with polyurethane or another cushioning material to alleviate an impact of the vibrating wire rope moving device on a wire rope moving track. Two moving rollers are shown in the figures.

The housing is provided with a wire rope locking mechanism which is used to firmly clamp the wire rope for the robots to climb. The wire rope locking mechanism may be a commercially available wire rope stopper, or may also be another mechanism for locking and limiting. There may be one, or two or more wire rope stoppers. When there is only one wire rope moving track, at least two wire rope stoppers are required, such that the wire rope with robots climbing thereon can conveniently move in the wellbore.

The moving rollers include a driving roller and one or more driven rollers (there is only one driven roller in the figure). Each moving roller is positioned and supported by a roller shaft which is mounted in the housing via a bearing. A drive motor base is fixedly mounted on the housing, and a power output end of the drive motor is connected via a reducer to the roller shaft which supports the driving roller. Driven by the drive motor, the driving roller can drive the driven rollers to move along the wire rope moving track.

Specifically, the driven roller is connected to the housing via the roller shaft and a cylindrical roller bearing, and is axially limited at the two ends respectively via bearing end covers. The driving roller is connected to the housing via the roller shaft and the cylindrical roller bearing; and is axially limited at one end via a bearing end cover and is connected to the reducer at the other end. Power of the drive motor is transmitted from the drive motor to the driving roller via the reducer.

In order that the wire rope moving device can move on the wire rope moving track along a preset trajectory (namely, the circumference of the wellbore wall), the wire rope moving device of the present invention is provided with a guide mechanism which includes a transverse guide mechanism and a longitudinal guide mechanism. The longitudinal guide mechanism is used to realize longitudinal (in an axial direction of the wellbore) positioning between the wire rope moving device and the wire rope moving track, thus preventing lateral deflection of the wire rope moving device. The transverse guide mechanism is used to realize horizontal (in a direction perpendicular to the axial direction of the wellbore) positioning between the wire rope moving device and the wire rope moving track.

Figure 5:
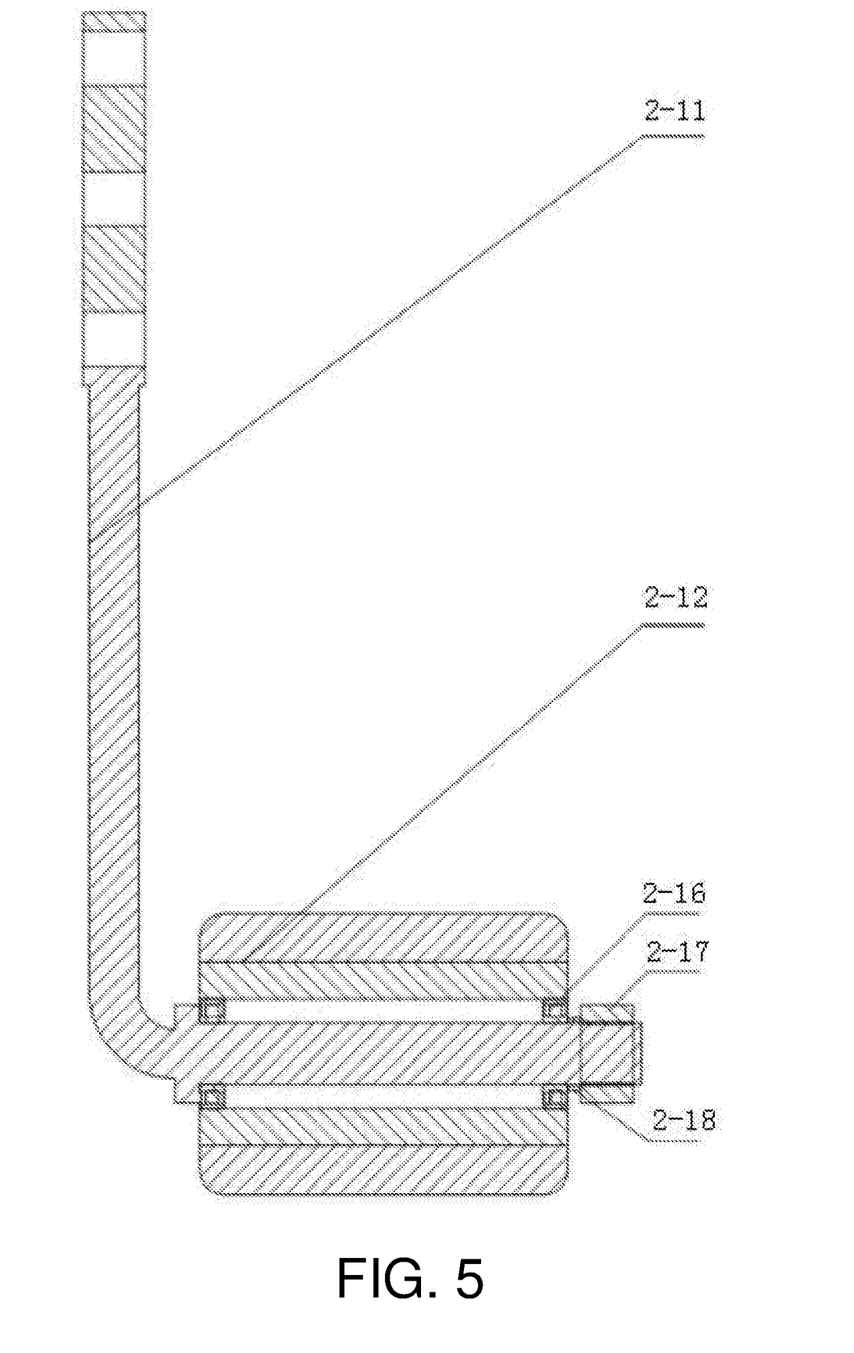
FIG. 5 is a schematic structural diagram of a transverse guide mechanism.

The transverse guide mechanism includes a transverse guide support and a transverse guide roller. The transverse guide support is connected to the housing at one end and connected to the transverse guide roller at the other end; and the transverse guide roller is axially parallel to a rolling face where the moving rollers are located. Specifically, as shown in FIG. 5, the transverse guide support is an L-shaped rod which is formed by a vertical section (a section of the L-shaped rod that is parallel to the axial direction of the wellbore) and a transverse section (a section of the L-shaped rod that is parallel to the transverse direction of the wellbore). The vertical section is connected to the housing and the transverse section is provided with a shaft shoulder. The transverse section at the outer side of the shaft shoulder is provided with the transverse guide roller, and a bearing is mounted between the transverse guide roller and the transverse section. The transverse section at the outer side of the transverse guide roller is provided with a limiting nut in a threaded connection manner. Thus, it can be learned that the transverse guide roller is positioned via the shaft shoulder at one side and is positioned via the limiting nut at the other side. The longitudinal guide mechanism includes a longitudinal guide support and a longitudinal guide roller. The longitudinal guide support is connected to the housing at one end and further connected to the longitudinal guide roller at the other end, and the longitudinal guide roller is axially perpendicular to the rolling face where the moving rollers are located. Driven by the drive motor, the driving roller operates in cooperation with the transverse guide mechanism and the longitudinal guide mechanism to implement positioning and guiding, thus driving the driven rollers to always move along the wire rope moving track.

Figure 6:
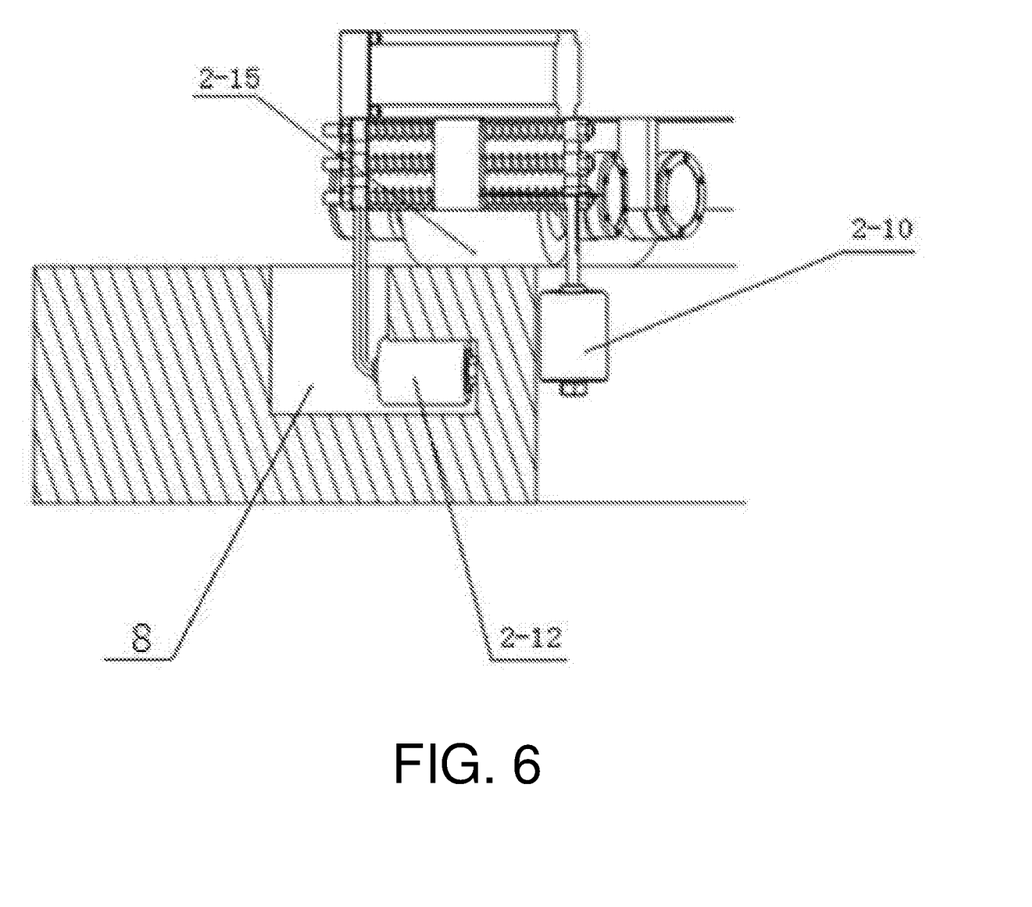
FIG. 6 is a structural cross-sectional enlarged view showing that a wire rope moving device is mounted in a wire rope moving track.

For ease of mounting of the moving rollers of the wire rope moving device and guide rollers (including the transverse guide roller and the longitudinal guide roller) of the guide mechanism, as shown in FIG. 6, the wire rope moving track of the present invention includes a rolling face, a transverse guide face, and a longitudinal guide face. One side of the rolling face is provided with the longitudinal guide face perpendicular to the rolling face, and the other side thereof is provided with an L-shaped groove formed by a vertical section and a transverse section which communicate at the bend. An extension direction of the vertical section is perpendicular to the rolling face, and an opening of the vertical section is flush with the rolling face. An extension direction of the transverse section is parallel to the rolling face, and the transverse section has the transverse guide face parallel to the rolling face. The moving rollers are directly provided above the rolling face. The transverse guide support is disposed in the vertical section of the groove, and the transverse guide roller is disposed in the transverse section. One end of the transverse guide support extends out of the vertical section and is then connected to the housing, and the other end of the transverse guide support is connected to the transverse guide roller hooked onto the transverse guide face. The transverse guide roller is connected to the transverse guide face via a wire, and the longitudinal guide roller is connected to the longitudinal guide face via a wire. Driven by the drive motor, the driving roller can drive the transverse guide roller to roll along the transverse guide face, the longitudinal guide roller to roll along the longitudinal guide face, and the driven rollers to roll along the rolling face. With such a structural design, the wire rope moving track of the present invention can provide a guide working face (namely, the transverse guide face and the longitudinal guide face) for the guide rollers and further provide a movement working face (namely, the rolling face) for the moving rollers; and additionally provide a mounting space for the transverse guide mechanism. Moreover, by a specific mounting manner, main parts (including the housing; and the moving rollers, the drive motor, and the roller shafts which are mounted in/on the housing) of the wire rope moving device can be fitted into the wire rope moving track via the transverse guide mechanism. It can be known from the above that the transverse guide mechanism of the present invention not only has a transverse guide function, but also connects the main parts of the wire rope moving device and the wire rope moving track.

In order that the wire rope moving device can circumferentially move along the wellbore wall, the housing is designed in a circular sector shape in the present invention. Referring to FIG. 5, according to the direction shown in FIG. 5, the circular-sector-shaped housing is a semi-closed casing which has an open circular-sector-shaped lower end face and is formed by successively connecting an upper circular-sector-shaped plate, a left lateral plate, a right lateral plate, a front arc-shaped plate, and a rear arc-shaped plate. The left lateral plate and the right lateral plate are respectively disposed on the left and right radial section ends of the circular-sector-shaped housing; the front arc-shaped plate is located on the outer circular surface of the circular-sector-shaped housing; and the rear arc-shaped plate is located on the inner circular surface of the circular-sector-shaped housing. In this case, the drive motor is directly mounted on the upper surface of the upper circular-sector-shaped plate, and the roller shafts are distributed in a radial direction of the circular-sector-shaped housing. The moving rollers can be exposed from the open circular-sector-shaped lower end face of the circular-sector-shaped housing, such that the moving rollers can directly contact the rolling face of the wire rope moving track.

When a different drive motor is selected according to a different load, a motor base, a coupler, or other devices may be added as required to fix the drive motor.

In order to realize a connection between the guide mechanism and the housing and further to ensure guide stability, the two radial section ends of the circular-sector-shaped housing are separately provided with a fixing rack, and each fixing rack is provided with one longitudinal guide mechanism and one transverse guide mechanism. The longitudinal guide mechanism is provided on the end, of the fixing rack, that adjoins the inner circular surface of the circular-sector-shaped housing; and the transverse guide mechanism is provided on the end, of the fixing rack, that adjoins the outer circular surface of the circular-sector-shaped housing. The two longitudinal guide mechanisms respectively provided on the two radial section ends of the circular-sector-shaped housing are symmetrically arranged, and the two transverse guide mechanisms respectively provided on the two radial section ends of the circular-sector-shaped housing are symmetrically arranged. The axis of the longitudinal guide roller is perpendicular to the circular-sector-shaped surface of the circular-sector-shaped housing, and the axis of the transverse guide roller is parallel to the circular-sector-shaped surface of the circular-sector-shaped housing. Positions where the longitudinal guide support and the transverse guide support are disposed on the fixing rack can be adjusted in a radial direction of the circular-sector-shaped housing.

Specifically, each fixing rack includes one or more horizontal rods. These horizontal rods are distributed at equal intervals in a height direction of each radial section end of the circular-sector-shaped housing, and the radial section end of the circular-sector-shaped housing is provided with a fixing block. The horizontal rods are supported and fixed via the fixing block and arranged in a radial direction of the circular-sector-shaped housing. The two ends of each horizontal rod are separately in threaded connection with a locking nut. The longitudinal guide support is provided with mounting holes a which are respectively corresponding to the horizontal rods. The horizontal rods are joined to the longitudinal guide support through their respectively corresponding mounting holes a, and a spring a is slipped on each horizontal rod between the longitudinal guide support and the fixing block. The spring a is disposed so as to reduce the interference on the movement of the main parts of the wire rope moving device when the longitudinal guide mechanism vibrations in operation. The transverse guide support is provided with mounting holes b which are respectively corresponding to the horizontal rods. The horizontal rods are joined to the transverse guide support through their respectively corresponding mounting holes b, and a spring b is slipped on each horizontal rod between the transverse guide support and the fixing block. The spring b is disposed so as to reduce the interference on the movement of the main parts of the wire rope moving device when the transverse guide mechanism vibrations in operation.

Figure 7:
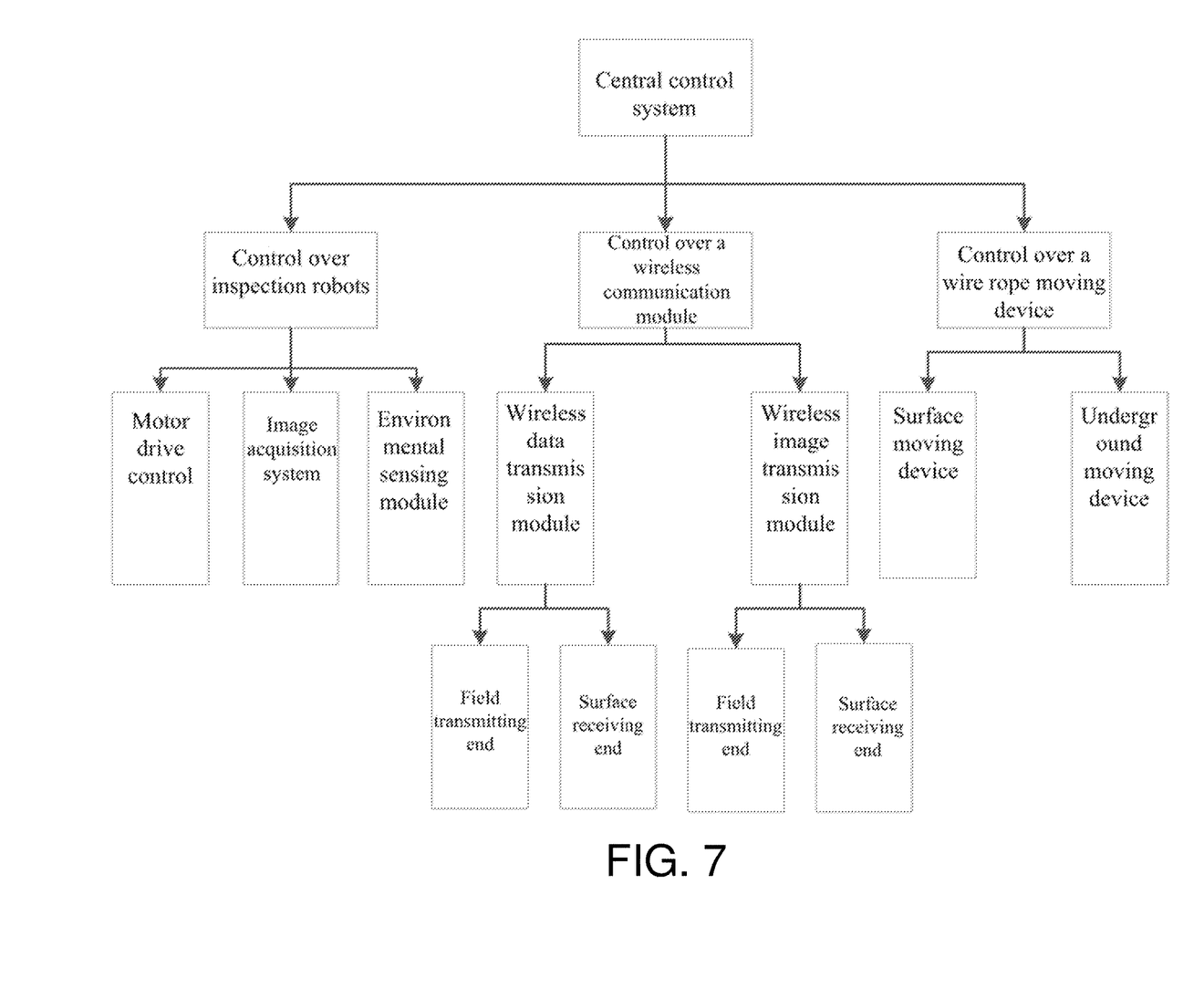
FIG. 7 is a composition block diagram of a central control system of the wellbore inspection system for an ultra-deep vertical shaft in an embodiment of the present invention.

FIG. 7 shows a central control system of the system of the present invention, which realizes a control over the inspection robots 4, the wireless communication module, and the wire rope moving device. The central control system is mainly used to make a proper strategic adjustment for the foregoing three parts, so as to realize overall inspection of the wellbore.

Figure 8:
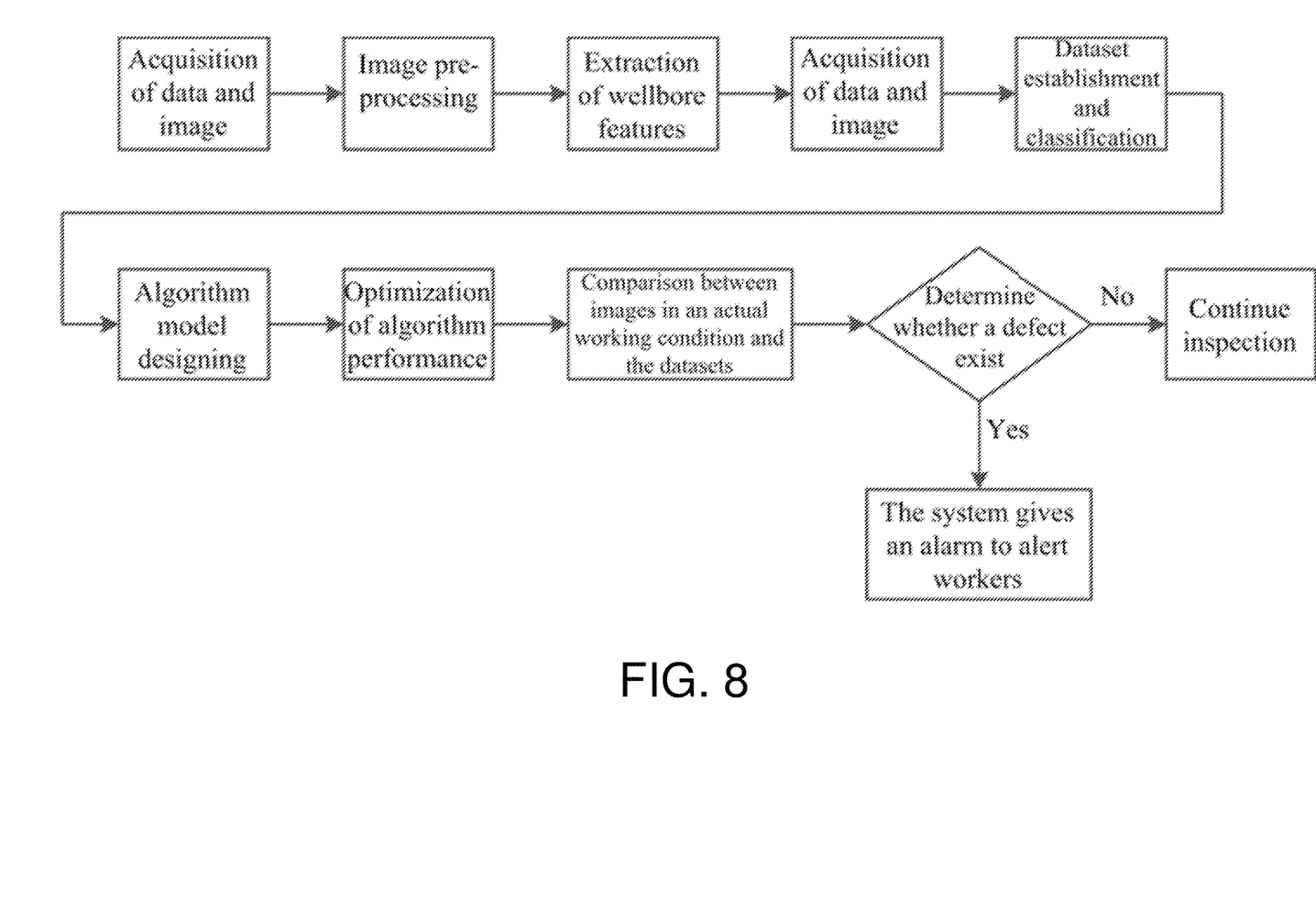
FIG. 8 is a flowchart of image processing by the wellbore inspection system for an ultra-deep vertical shaft in an embodiment of the present invention.

FIG. 8 is a flowchart of image processing by the system of the present invention, which mainly includes a series of procedures from image acquisition in situ to monitoring of wellbore health. The procedures mainly include the following steps: acquiring data and images; pre-processing the images; extracting wellbore features; establishing and classifying datasets; designing an algorithm model; optimizing algorithm performance; making a comparison between images in an actual working condition and the datasets; further determining whether the wellbore has a defect; and giving an alarm to alert workers if a defect exists, or otherwise continuing the inspection.

The present invention has the following operation process:

The first step is a preparation phase. First, a surface wire rope guide rail 1, a surface wire rope moving device 2, an underground wire rope guide rail 6, an underground wire rope moving device 7, and a wire rope 5 are mounted. The wire rope guide rails are respectively mounted on the ground and underground by corresponding mounting manners according to an actual application environment, and the wire rope 5 is adjusted via the wire rope moving devices to be parallel to the axis of the wellbore and then is put into the wellbore. The wire rope in the shaft is fastened to the underground wire rope moving device 7, and the other end of the wire rope is fastened to the surface wire rope moving device 2 after being tensioned. After the foregoing mounting procedure is completed, a central control system is used to adjust the wire rope moving devices so that the surface wire rope moving device 2 and the underground wire rope moving device 7 are synchronized, thus maintaining a parallel condition between the wire rope 5 and the axis of the wellbore. Afterwards, inspection robots 4 are mounted on the wire rope 5, and are driven according to an instruction sent by the central control system to move to designated arrangement positions. After the inspection robots are respectively arranged on the designated positions, the central control system checks whether all the inspection robots 4 work normally. Finally, hardware and software are all debugged to eliminate the problems of a communication delay and packet loss of the inspection robots 4, to check whether movement is stable and whether the received data is clear, and the like, thus ensuring stable running of the monitoring system.

The second step is an inspection phase. The monitoring system is started to inspect the wellbore. Each inspection robot monitors the wellbore within its designated inspection region, captures wall images of the wellbore, and uploads the acquired images to an upper computer. Further, real-time position information of the inspection robots 4 and real-time information of the wire rope moving devices are also uploaded to the upper computer in real time. During inspection, the wire rope moving devices drive the wire rope 5 to make one turn around the wellbore. The inspection robots 4 are arranged on the wire rope 5 and can climb on the wire rope 5, to monitor the wellbore within their respective designated inspection scopes. By coordination between the climbing movement of the inspection robots 4 and the movement of the wire rope moving devices, overall inspection of the wellbore is realized.

The third step is an image post-processing phase. After the inspection robots 4 upload the wellbore images captured during the inspection to the upper computer, the upper computer processes the received images to determine whether the wellbore is healthy or not. The processing the wellbore images includes the following steps: pre-processing the wellbore images; performing feature extraction; establishing and classifying datasets; establishing a correspondence between data feature points; determining and analyzing image categories; further determining a condition of the wellbore; and giving an alarm to alert workers if a defect exists, or otherwise continuing the inspection, thus completing real-time monitoring of the wellbore. The image post-processing technique mentioned in the present invention may be a relatively mature general image processing technique in the prior art, so the details are not described herein again.

The above merely describes preferred embodiments of the present invention. It should be noted that, several improvements and modifications may be made by those of ordinary skill in the art without departing from the principle of the present invention, and these improvements and modifications should also be considered within the scope of protection of the present invention.

What is claimed is:

1. A wellbore inspection system for an ultra-deep vertical shaft, comprising a wire rope moving system, inspection robots, a visual image acquisition system, a wireless communication module, a central control system, and an image post-processing system of an upper computer, wherein the wire rope moving system comprises: a surface wire rope guide rail on a ground, an underground wire rope guide rail, a surface wire rope moving device fitted into the surface wire rope guide rail, an underground wire rope moving device fitted into the underground wire rope guide rail, and a wire rope of which an upper end is connected to the surface wire rope moving device and a lower end is connected to the underground wire rope moving device; and a plurality of inspection robots are arranged along the wire rope;

the wireless communication module comprises a wireless data transmission module, a wireless image transmission module, and a GPS positioning module;

the visual image acquisition system comprises a lower computer and explosion-proof cameras; after an image information acquired by the explosion-proof cameras is processed by the lower computer, a processed image is transmitted by the wireless image transmission module to the image post-processing system of the upper computer;

the central control system is connected to the inspection robots and the wire rope moving system via the wireless data transmission module, and the inspection robots are connected to the central control system via the GPS positioning module;

the central control system comprises an inspection robot control module for controlling working conditions of the inspection robots; a wire rope moving device control module for controlling movement of the surface wire rope moving device and the underground wire rope moving device in the wire rope moving system; and a wireless communication control module for controlling communication between the central control system, the inspection robots, and the wire rope moving system; and when it is required to longitudinally monitor the wellbore, the central control system halts the wire rope moving system and starts the inspection robots to longitudinally climb on the wire rope, to acquire longitudinal images of the wellbore with the explosion-proof cameras; when it is required to monitor the circumference of the wellbore, the central control system halts the inspection robots to suspend the inspection robots on the wire rope; and starts the wire rope moving system to drive the inspection robots on the wire rope to acquire circumferential images of the wellbore; and when it is required to monitor specific positions in the wellbore, the central control system controls the inspection robots and the wire rope moving system simultaneously until the inspection robots reach target positions, and then the explosion-proof cameras are used to acquire images of the target positions in the wellbore.

2. The wellbore inspection system for an ultra-deep vertical shaft according to claim 1, wherein the image post-processing system of the upper computer forms a monitoring network in the wellbore according to an image information fed back by the explosion-proof cameras respectively carried by the inspection robots; when one or some of the inspection robots fail, the central control system uses the inspection robot control module to automatically control drive mechanisms of remaining normal inspection robots and uses the wire rope moving device control module to automatically control a drive mechanism of the wire rope moving system according to influence of the faulty inspection robot on the monitoring network, to adjust a patrol and monitoring scope of each normal inspection robot and further to repair the monitoring network.

3. The wellbore inspection system for an ultra-deep vertical shaft according to claim 1, wherein
the underground wire rope moving device and the surface wire rope moving device are identical in structure, and separately comprise a housing, a drive motor, and a plurality of moving rollers; a wire rope locking mechanism capable of firmly clamping the wire rope is provided on the housing; and the moving rollers comprise a driving roller and one or more driven rollers; and each moving roller is positioned and supported by a roller shaft which is mounted in the housing via a bearing; a drive motor base is fixedly mounted on the housing, and a power output end of the drive motor is connected via a reducer to the roller shaft which supports the driving roller.

4. The wellbore inspection system for an ultra-deep vertical shaft according to claim 3, wherein the underground wire rope moving device and the surface wire rope moving device are each provided with a guide mechanism; the guide mechanism comprises a transverse guide mechanism and a longitudinal guide mechanism; the transverse guide mechanism comprises a transverse guide support and a transverse guide roller; the transverse guide support is connected to the housing at one end and further connected to the transverse guide roller at the other end, and the transverse guide roller is axially parallel to a rolling face where the moving rollers are located; the longitudinal guide mechanism comprises a longitudinal guide support and a longitudinal guide roller; the longitudinal guide support is connected to the housing at one end and further connected to the longitudinal guide roller at the other end, and the longitudinal guide roller is axially perpendicular to the rolling face where the moving rollers are located; and driven by the drive motor, the driving roller operates in cooperation with the transverse guide mechanism and the longitudinal guide mechanism to implement positioning and guiding, thus driving the driven rollers to always move along a wire rope moving track.

5. The wellbore inspection system for an ultra-deep vertical shaft according to claim 4, wherein a track main body further comprises a transverse guide face and a longitudinal guide face; one side of the rolling face is provided with the longitudinal guide face perpendicular to the rolling face, and the other side thereof is provided with an L-shaped groove formed by a vertical section and a transverse section which communicate at a bend; an extension direction of the vertical section is perpendicular to the rolling face, and an opening of the vertical section is flush with the rolling face; an extension direction of the transverse section is parallel to the rolling face, and the transverse section has the transverse guide face parallel to the rolling face; the moving rollers are directly provided above the rolling face; the transverse guide support is disposed in the vertical section of the groove, and the transverse guide roller is disposed in the transverse section; one end of the transverse guide support extends out of the vertical section and is then connected to the housing, and the other end of the transverse guide support is connected to the transverse guide roller hooked onto the transverse guide face; the transverse guide roller is connected to the transverse guide face via a wire, and the longitudinal guide roller is connected to the longitudinal guide face via a wire; and driven by the drive motor, the driving roller is able to drive the transverse guide roller to roll along the transverse guide face, the longitudinal guide roller to roll along the longitudinal guide face, and the driven rollers to roll along the rolling face.

6. The wellbore inspection system for an ultra-deep vertical shaft according to claim 5, wherein the housing is designed in a circular sector shape, and the roller shafts are distributed in a radial direction of the circular-sector-shaped housing; two radial section ends of the circular-sector-shaped housing are separately provided with a fixing rack, and each fixing rack is provided with one longitudinal guide mechanism and one transverse guide mechanism; the longitudinal guide mechanism is provided on an end, of the fixing rack, that adjoins an inner circular surface of the circular-sector-shaped housing; and the transverse guide mechanism is provided on an end, of the fixing rack, that adjoins an outer circular surface of the circular-sector-shaped housing; the two longitudinal guide mechanisms respectively provided on the two radial section ends of the circular-sector-shaped housing are symmetrically arranged, and the two transverse guide mechanisms respectively provided on the two radial section ends of the circular-sector-shaped housing are symmetrically arranged; an axis of the longitudinal guide roller is perpendicular to the circular-sector-shaped surface of the circular-sector-shaped housing, and an axis of the transverse guide roller is parallel to the circular-sector-shaped surface of the circular-sector-shaped housing; positions where the longitudinal guide support and the transverse guide support are disposed on the fixing rack are able to be adjusted in a radial direction of the circular-sector-shaped housing.

7. A wellbore inspection method for an ultra-deep vertical shaft, comprising the following steps:
   (1) before inspection, vertically dividing a wellbore into sections, and equipping each section with one inspection robot using a wire rope moving system, such that the inspection robots take charge of inspection in their respective regions, wherein the wire rope moving system comprises: a surface wire rope guide rail on a ground, an underground wire rope guide rail, a surface wire rope moving device fitted into the surface wire rope guide rail, an underground wire rope moving device fitted into the underground wire rope guide rail, and a wire rope of which an upper end is connected to the surface wire rope moving device and a lower end is connected to the underground wire rope moving device; determining position information of the inspection robots during arranging the inspection robots along the wire rope arrangement of the inspection robots; and further positioning the underground wire rope moving device and the surface wire rope moving device before inspection;
   (2) during inspection, monitoring, by each inspection robot, the wellbore within its designated inspection region, capturing wall images of the wellbore with an explosion-proof camera, and uploading acquired images to an image post-processing system of an upper computer; acquiring, by a GPS positioning module, real-time position information of the inspection robots and uploading the information to a central control system; detecting position information of the underground wire rope moving device and the surface wire rope moving device in real time by using position detection devices respectively mounted on the underground wire rope moving device and the surface wire rope moving device, and uploading the information to the central control system in real time; determining, by the central control system according to the received real-time position information of the underground wire rope moving device and the surface wire rope moving device, whether the two moving devices are synchronized in movement; and if they are not synchronized in movement, controlling the underground wire rope moving device and the surface wire rope moving device to be synchronized in movement; and
   (3) after the inspection, processing, by the image post-processing system of the upper computer, the acquired images, to determine whether the wellbore has a defect.

\* \* \* \* \*